Feb. 24, 1970   J. LUDEMANN ET AL   3,497,740
ELECTRICAL ROTATING MACHINE
Filed Aug. 17, 1967                                  2 Sheets-Sheet 1

Inventors:
Joseph Ludemann
Heino Gerke
BY Spencer & Kaye
   Attorneys

United States Patent Office 3,497,740
Patented Feb. 24, 1970

3,497,740
ELECTRICAL ROTATING MACHINE
Joseph Ludemann and Heino Gerke, Oldenburg, Germany, assignors to Licentia Patent-Verwaltungs-G.m.b.H., Frankfurt am Main, Germany
Filed Aug. 17, 1967, Ser. No. 661,261
Claims priority, application Germany, Aug. 18, 1966,
L 54,333
Int. Cl. H02k 1/12, 3/28
U.S. Cl. 310—187                                             5 Claims

ABSTRACT OF THE DISCLOSURE

An electrical rotating machine having bearing plates mounted internally to the stator. The stator windings are not distributed around the circumference of the stator but are arranged in parallel on two opposite sides of the stator, approximately radially with respect to the stator axis.

BACKGROUND OF THE INVENTION

The present invention relates to electrical rotating machinery having several exciter windings, the flux created by each exciter winding being out of phase with the flux created by each of the others.

Rotating electrical machinery of this type, electric motors, in particular, may be provided, for example, with two field windings having their electrical as well as spatial axes displaced by 90°. The coil heads of these windings are therefore distributed around the entire circumference of the stator. The axial lengths of these motors, largely determined by the length of the windings with their corresponding coil heads, are additionally increased by bearing plates which must be situated beyond the farthest axial projection of the coil heads to provide some clearance between the plates and the coil heads.

SUMMARY OF THE INVENTION

An object of the invention is to decrease the axial length of electric motors of the type having several exciter windings the flux of each being displaced in phase from the flux of each of the others.

This and other objects according to the present invention are achieved by arranging the exciter windings radially on opposite sides of the axis of the stator with their spatial axes running approximately parallel. This arrangement affords space between the windings and winding heads which may be used for internally mounting bearing plates. The axial length of the motor may be therefore reduced in this way by the amount equal to the width of the bearing plates and the airgap between the plates and the winding heads. The required electrical phase angle between the fluxes generated by the various windings is present, despite the spatially parallel arrangement of the exciter windings, if the poles be constructed according to the present invention.

DESCRIPTION OF THE PREFERRED EMBODIMENTS

Figure 1:
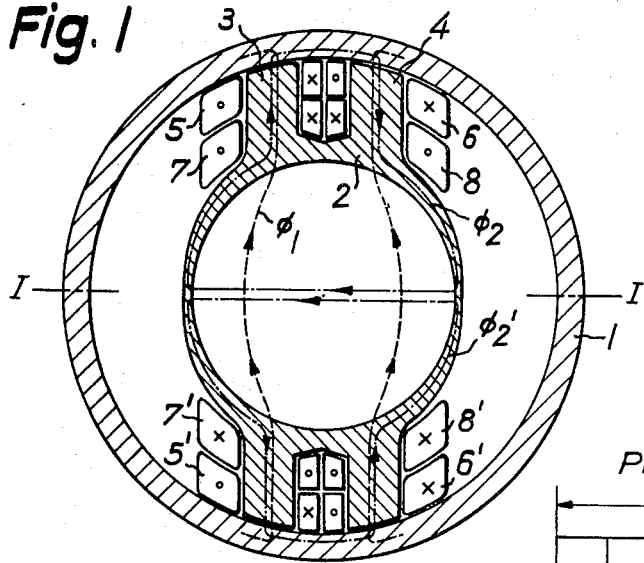
FIGURE 1 is a cross-sectional diagram showing a stator of an electric motor with windings arranged according to one embodiment of the present invention.
Figure 2:
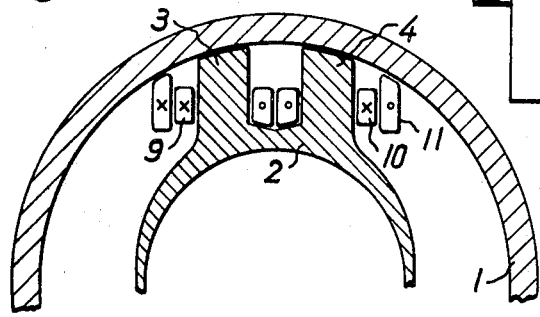
FIGURE 2 is a cross-sectional diagram showing one half of a symmetrical stator with its windings arranged according to another embodiment of the present invention.
Figure 3:
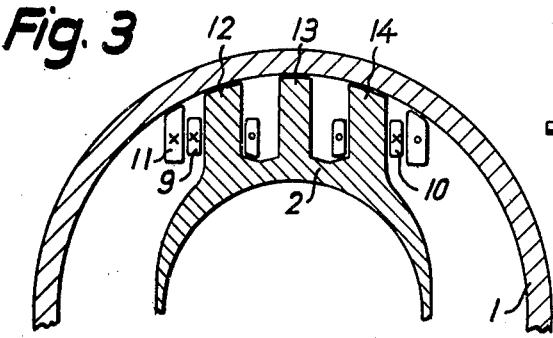
FIGURE 3 is a cross-sectional diagram showing one half of a symmetrical stator with its windings arranged according to a third embodiment of the present invention.

Referring now to the drawings, FIGURES 1 to 3 are cross-sectional diagrams of three embodiments of a stator comprising an annular yoke 1, a pole 2 and various windings arranged with respect to the pole. FIGURE 1 shows the pole 2 split into two magnetic cores 3 and 4 around which the four coils 5, 6, 7 and 8 are wound. The flux generated by windings 5 and 6 is designated $\phi_1$; the flux generated by windings 7 and 8 is designated $\phi_2$. Flux $\phi_1$ (dashed lines) is turned 90° electrical in the airgap at the center of the stator with respect to the flux $\phi_2$ (dotted dashed lines). The flux $\phi_1$ generated by windings 5 and 6 passes through the annular yoke 1, joins the flux generated by windings 5' and 6' having the opposite polarity and closes upon itself through the air space occupied by a rotor, not shown. Flux $\phi_2$ flows out through winding 7 down through winding 8 and back again. Since the corresponding windings 7' and 8' generate the oppositely directed flux $\phi_2'$, both $\phi_2$ and $\phi_2'$ are constrained to cross through the center of the air space at an angle of 90° with respect to the direction of $\phi_1$.

Figure 1A:
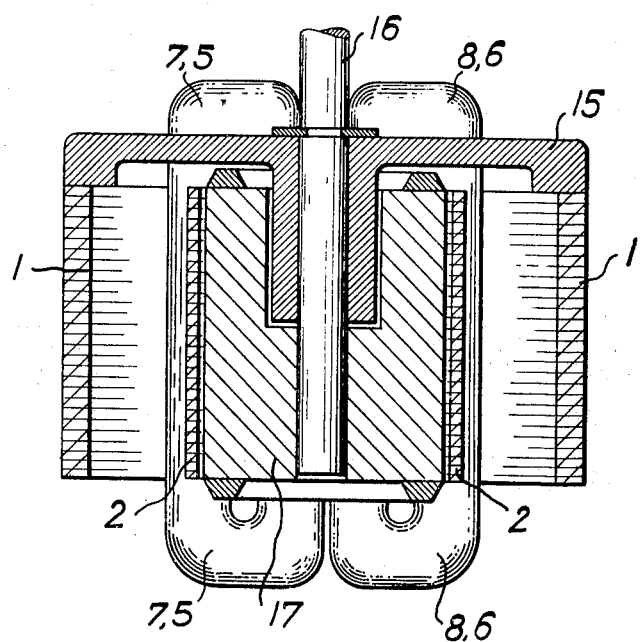

FIGURE 1a is a sectional view taken axially through a motor as in FIGURE 1 on the line I—I. The one-sided bearing plate 15 in form of a bearing bridge intermediate of the winding heads 7, 7' and 8, 8' is integrally mounted on the annular yoke 1. The rotor 17 is pressed on the shaft 16.

FIGURE 2 shows a different arrangement of exciter windings according to another embodiment of the present invention. The annular yoke is again designated 1 and the stator 2. Three exciter windings are arranged on the two magnetic cores 3 and 4 in such a way that the flux generated by windings 9 and 10 which cross the air space at the center of the stator is at 90 electrical degrees with respect to flux generated by winding 11.

In the embodiment shown in FIGURE 3 the stator pole 2 is split into three magnetic cores 12, 13 and 14. Exciter windings 9 and 10 are mounted on the cores 12 and 14 while the winding 11 surrounds the entire pole. The flux generated by windings 9 and 10 traverses the air space at the center of the stator and is turned 90 electrical degrees with respect to the flux of winding 11. To better match the fluxes it is also possible to reduce in height the windings 9 and 10, and within the space gained thereby, to place winding 11 above or below these two. It is also possible to mount winding 11 on core 13. Although the flux flowing through the entire width of the pole would, in this case, be somewhat less, this design permits the three-phase connection of the motor windings.

Figure 4:
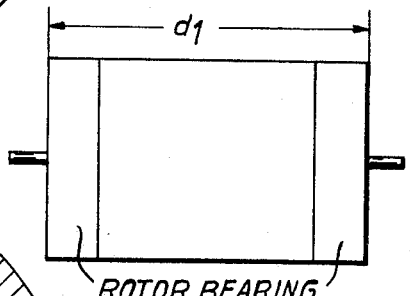
FIGURE 4 and FIGURE 5 are side views of electric motors, according to the prior art and to the invention respectively, showing the relative lengths of each.
Figure 5:
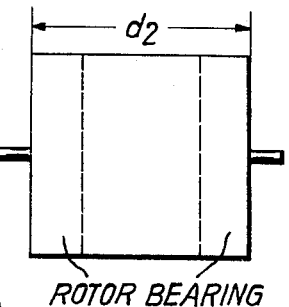

FIGURE 4 and FIGURE 5 are side views of electrically equivalent motors, according to the prior art and to the present invention, respectively, showing the relative axial lengths of each. The end bearing plates shown on the motor of the prior art contribute to the motor's length making is considerably longer $d_1$ than the length of the stator poles alone. The motor shown in FIGURE 5, on the other hand, having exciter windings arranged according to the present invention and a rotor mounted on internally secured bearing plates, need only be as long $d_2$ as the stator poles themselves.

What is claimed is:

1. A two-pole alternating current motor comprising, in combination:

(a) two radially extending magnetic poles arranged on a stator on opposite sides of the motor axis, each of said poles including a pair of magnetic cores which extend approximately parallel to each other;

(b) a first phase winding comprising four first partial windings, each of which surrounds one of said magnetic cores, said first partial windings being electrically connected such that the magnetic flux generated by the flow of current through said first phase winding will be oppositely directed within said pair of magnetic cores of each of said magnetic poles; and (c) a second phase winding comprising at least two second partial windings arranged at said two magnetic poles, said second partial windings being electrically connected such that the magnetic flux generated by the flow of current through said second phase winding will be similarly directed within said pair of magnetic cores of each of said magnetic poles, whereby the phases of the magnetic fluxes produced by said first and second phase windings will be displaced in time by 90° and will result in induction distributions displaced spacially around the circumference of the rotor of the motor by 90°.

2. The motor defined in claim 1, wherein said second phase winding has four of said second partial windings, and each of said second partial windings surrounds one of said magnetic cores.

3. The motor defined in claim 1, wherein said second phase winding has two of said second partial windings, and each of said second partial windings surrounds said pair of magnetic cores of one of said magnetic poles.

4. The motor defined in claim 3, wherein said first and second partial windings are arranged to surround each other on a common plane at each of said two magnetic poles.

5. The motor defined in claim 3, wherein each of said two magnetic poles further include a third magnetic core arranged between said pair of magnetic cores thereof.

References Cited
UNITED STATES PATENTS

| 1,485,742 | 3/1924 | Turbayne | 310—149 |
|---|---|---|---|
| 2,235,075 | 3/1941 | Kimball | 310—184 |

FOREIGN PATENTS 117,934  8/1918  Great Britain.

MILTON O. HIRSHFIELD, Primary Examiner

L. A. ROUSE, Assistant Examiner